Patented Mar. 29, 1932

1,851,413

UNITED STATES PATENT OFFICE

GEORGE MILLER THOMSON, OF CALEDONIA, ONTARIO, CANADA, ASSIGNOR TO CANADA GYPSUM AND ALABASTINE, LIMITED, OF PARIS, ONTARIO, CANADA

CELLULAR INSULATING MATERIAL

No Drawing.   Application filed October 6, 1927. Serial No. 224,520.

This invention relates to an insulating material, prepared from quick-setting cementitious material, and of such character that it may readily be put into place in walls or other portions of buildings for preventing the transference of heat, cold or sound.

The use of quick-setting cementitious materials, such as gypsum, for the manufacture of building materials, such as wall board and blocks, is well known and it is now common practice to make such building materials porous or cellular to increase their insulating capacity and decrease their weight. The cellular structure is produced by mixing with a plastic mass of the gypsum or other quick-setting cementitious material, bubbles of air or gas, or by forming the same therein, so that when the mass is given the desired shape and dried, it is uniformly interspersed with cells. Such material is well adapted for the construction of new buildings or for the repair of old ones.

Moreover gypsum products have heretofore been prepared for the insulation of the walls and other parts of erected buildings. The calcined gypsum is mixed with certain ingredients, which when water is added to the mixture releases gas which forms cells in the plastic mass when the same is allowed to set.
The plastic mass so prepared is poured into the walls of the building, or other place to be insulated, such as the attic floor, and is there allowed to dry and set. Such product has disadvantages however. It dries slowly when poured into sealed or partially sealed compartments and when the wet mass is placed within the walls of a building, there is the tendency for the water as it leaves the plastic mass to dampen the plaster on the wall, discolour the paper or other decoration thereon and thus deteriorate the condition of the wall. It is also difficult to pour the plastic mass into small openings in a wall on account of its quick-setting tendencies.
It is thus an object of this invention to overcome these difficulties and to produce a dry cellular insulating material which can be readily placed in any desired portion of a building to insulate the same, without damage thereto and without the attention of a skilled operator.

Various vegetable materials have been used for such insulating purpose, but these are not fire, water or vermin proof and have a tendency to compress or break down with age, leaving uninsulated portions at the top of the compartment filled thereby, where, usually, insulation is most needed.

This invention contemplates the production of a water proof insulating material which is resistant to fire and the action of vermin and which, while light in weight, is strong enough to resist crumbling, which causes sagging, leaving unfilled thus uninsulated portions within the wall.

In accordance with the invention cellular gypsum, or other quick-setting cementitious material, is formed into spherical bodies of such sizes that they may be readily poured, for example, through small openings in the wall of a building to fill up the spaces therein. The size of the bodies is preferably varied so that the voids within the mass may be substantially filled. The final voids may be filled with crushed gypsum. The shape of the product need not be truly spherical, but it should be such that the product will be mobile enough to flow into irregularly shaped cavities within the wall of a building. Cylindrical or oval shaped bodies, for example, meet this requirement fairly well. The finished material is dry and is given the mobile form during the course of manufacture. It is preferably given a coating of a waterproofing material, such as casein glue, to toughen and strengthen its surface and render it non-hygroscopic. The material may thus be stored indefinitely and may be shipped in bags or other suitable containers.

In making the material, a slurry of gypsum or other quick-setting cementitious material is impregnated with air or gas bubbles in any desired way and the slurry with uniformly incorporated bubbles is run into moulds of the desired shape, where the material is allowed to set and form the mobile bodies constituting the insulating materials. These bodies are then preferably dipped in a water-proofing material, such as casein glue, which toughens the surface, renders the bodies less apt to break down and makes them non-hygroscopic.

For example, from the mixer in which the slurry and bubbles are uniformly mixed together, the mass may be run onto a continuous belt, having semi-circular cavities therein, and a second continuous belt having corresponding cavities may be brought into contact therewith under a squeeze roll, where the mass fills the cavities and takes on the form of the finished bodies. While in these moulds the bodies may be allowed to set. After drying, or even before they are fully dried, the bodies are preferably dipped into a bath of waterproofing material, such as casein glue. The bodies forming the mobile mass of the cellular product may be formed in batches with multiple moulds or in any other desired way. Various other methods of forming the material will suggest themselves, but as this invention is not directed to any specific way of forming the bodies, details of the processes suggested therefor are not given herein.

It will be apparent that bodies of this character constitute a mass, which is mobile and which thus may be poured into place through relatively small openings. The bodies are made in a variety of sizes so that the voids in a mass thereof are substantially filled and to more completely fill the voids and/or space within the wall to be insulated crushed cellular gypsum may be used. The waterproofing material tends to toughen the surface of the cellular bodies and renders them non-hygroscopic. They are thus not effected by moisture in the atmosphere and when in contact with wood do not supply moisture which tends to propagate fungus bacteria. The strength of the bodies will vary of course with the porosity of the material, which can be regulated as desired.

What I claim is:

1. An insulating material comprising small rounded bodies of gypsum filled with gas bubbles, said balls being adapted to be poured into voids of a wall larger than said bodies, the mass of said bodies being mobile so as to roll over each other and substantially fill said voids.

2. An insulating material comprising small rounded bodies of gypsum filled with gas bubbles, said bodies being waterproof only on their outer surfaces and adapted, when they are poured into the voids of a wall larger than said bodies, to roll over each other to substantially fill said voids.

GEORGE M. THOMSON.